United States Patent
Campbell et al.

(10) Patent No.: US 10,023,722 B2
(45) Date of Patent: Jul. 17, 2018

(54) OXYGEN PLASMA-RESISTANT COMPOSITION CHARACTERIZED BY LOW STICKING, AND RELATED METHODS

(75) Inventors: Ronald R. Campbell, Harleysville, PA (US); Eugene Gurevich, Feasterville, PA (US)

(73) Assignees: Greene, Tweed Technologies, Inc., Wilmington, DE (US); Daikin Industries, Ltd., Osaka (JP)

(*) Notice: Subject to any disclaimer, the term of this patent is extended or adjusted under 35 U.S.C. 154(b) by 0 days.

(21) Appl. No.: 12/420,419

(22) Filed: Apr. 8, 2009

(65) Prior Publication Data

US 2010/0093898 A1  Apr. 15, 2010

Related U.S. Application Data

(60) Provisional application No. 61/043,314, filed on Apr. 8, 2008.

(51) Int. Cl.
| | |
|---|---|
| *C08K 5/18* | (2006.01) |
| *C08K 5/29* | (2006.01) |
| *C08K 5/33* | (2006.01) |
| *C08L 27/12* | (2006.01) |
| *C08L 71/00* | (2006.01) |
| *C08K 5/00* | (2006.01) |

(52) U.S. Cl.
CPC ............ *C08K 5/18* (2013.01); *C08K 5/29* (2013.01); *C08K 5/33* (2013.01); *C08L 27/12* (2013.01); *C08K 5/0025* (2013.01); *C08L 71/00* (2013.01)

(58) Field of Classification Search
CPC .................................................. C08K 5/33
USPC ............... 524/90, 544–546; 525/326.2, 374; 526/247
See application file for complete search history.

(56) References Cited

U.S. PATENT DOCUMENTS

| | | | |
|---|---|---|---|
| 4,281,092 A | | 7/1981 | Breazeale |
| 4,316,836 A | * | 2/1982 | Aufdermarsh, Jr. ............ 524/90 |
| 4,882,113 A | * | 11/1989 | Tu et al. ....................... 264/127 |
| 4,983,680 A | | 1/1991 | Ojakaar |
| 5,001,278 A | | 3/1991 | Oka et al. |
| 5,134,170 A | * | 7/1992 | Ohata et al. .................... 521/82 |
| 5,447,993 A | | 9/1995 | Logothetis |
| 5,696,189 A | | 12/1997 | Legare |
| 6,114,452 A | * | 9/2000 | Schmiegel .................... 525/194 |
| 7,514,506 B2 | * | 4/2009 | Mansfield et al. ............ 525/374 |
| 2004/0214956 A1 | | 10/2004 | Aufdermarsh et al. |
| 2005/0020859 A1 | | 1/2005 | Aufdermarsh |
| 2005/0272887 A1 | * | 12/2005 | Ameduri et al. ............. 526/248 |
| 2006/0287438 A1 | | 12/2006 | Mansfield et al. |
| 2007/0117915 A1 | | 5/2007 | Funaki et al. |
| 2008/0021148 A1 | * | 1/2008 | Adair et al. .................. 524/544 |

FOREIGN PATENT DOCUMENTS

| | | | |
|---|---|---|---|
| JP | 2858198 B | * | 2/1999 |
| WO | WO 00/08076 | | 2/2000 |
| WO | WO 2004/069900 A2 | | 8/2004 |
| WO | WO 2006011533 A1 | * | 2/2006 |
| WO | WO 2008/094758 A1 | | 8/2008 |

OTHER PUBLICATIONS

Machine translation of Iwata, JP 2858198 B, translated on Mar. 10, 2011.*
Supplementary European Search Report, Dated Sep. 26, 2011, 5 pages.

* cited by examiner

*Primary Examiner* — Nicole M Buie-Hatcher
(74) *Attorney, Agent, or Firm* — Flaster/Greenberg P.C.

(57) ABSTRACT

The invention provides a curable fluoroelastomeric composition comprising: (i) a fluoropolymer comprising at least one cure site monomer that comprises at least one cyano group; (ii) a cure system comprising a functionalized biphenyl-based compound and at least one of: a dioxime compound represented by the formula (I): HON=$R^1$=NOH wherein $R^1$ is chosen from an alkyl group having 1 to 10 carbon atoms and an aryl group having 1 to 10 carbon atoms; a monoamidine-based compound represented by formula (IV):

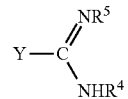

wherein Y is chosen from a substituted or unsubstituted alkyl, aryl, or aralkyl group or an unsubstituted or substituted fully or partially halogenated alkyl, aryl, or aralkyl group having to 22 carbon atoms; $R^4$ is chosen from a hydrogen atom or a substituted or unsubstituted lower alkyl group of 1 to 6 carbon atoms, or an amino group; $R^5$ is independently chosen from hydrogen atom, a substituted or unsubstituted lower alkyl group of 1 to 6 carbon atoms, an amino group or an hydroxyl group; and/or a perfluoropolyether. Also included are additional related compositions and methods.

12 Claims, No Drawings

OXYGEN PLASMA-RESISTANT COMPOSITION CHARACTERIZED BY LOW STICKING, AND RELATED METHODS

CROSS REFERENCE TO RELATED APPLICATION

This application claims priority to U.S. Provisional Patent Application Ser. No. 61/046,314, filed 8 Apr. 2008, the contents of which are incorporated herein by reference.

BACKGROUND OF THE INVENTION

Fluoroelastomers, and more particularly, perfluoroelastomers are materials known for their high levels of chemical resistance, plasma resistance, acceptable compression set resistance and satisfactory mechanical properties. When high temperature or aggressive or harsh environments, such as corrosive fluids, solvents, lubricants, and oxidizing or reducing conditions are present in a process or end use environment, perfluoroelastomers are often selected. Perfluoroelastomers are typically formed by using perfluorinated monomers, including a perfluorinated cure site monomer, polymerizing the monomers and curing (cross-linking) the composition using a curing agent which reacts with the incorporated cure site monomer to form a material which exhibits elastomeric properties. Common cure site monomers include, among others, those having cyano cure sites. Examples of primary and secondary cyano-containing cure site monomers are known in the art. It is believed that in cure site monomers having cyano cure sites, certain curing agents trimerize the cyano cure sites that join to form triazine crosslinks.

Known curing agents include organometallic compounds and the hydroxides thereof, especially organotin compounds, including allyl-, propargyl-, triphenyl- and allenyl tin and the hydroxides. The tetraalkyltin compounds or tetraaryltin compounds, for example tetraphenyltin, are common. However, these curing agents provide a relatively slow rate of cure, are toxic and can introduce metallic contaminants to resulting elastomers.

Organic peroxides, e.g., dialkyl peroxides, are also known primary curing agents used with co-agents such as triallylisocyanurates for curing perfluoropolymers incorporating $CH_{2x}$ and other functional groups for crosslinking. Organic peroxide cures are typically more rapid than those noted above, and can provide better chemical resistance properties and good processability, but are relatively thermally unstable. Such peroxide and co-agent curing systems are known and are exemplified in U.S. Pat. No. 4,983,680. Similarly, the use of such curing systems in conjunction with a second, different curing system, so-called dual cure systems are also known, for example, U.S. Pat. No. 5,447,993 and WO 02/060969 A1.

Curing agents containing amino groups have also been employed. These include diamines and diamine carbamates, such as N,N'-dicinnamylidene-1,6-hexanediamine, trimethylenediamine, cinnamylidene trimethylenediamine, cinnamylidene ethylenediamine, and cinnamylidene hexamethylenediamine, hexamethylenediamine carbamate, bis(4-aminocyclohexyl)methane carbamate, 1,3-diaminopropane monocarbamate, ethylenediamine carbamate and trimethylenediamine carbamate.

Use of functionalized biphenyl-based curatives, such as 2,2-bis[3-amino-4-hydroxyphenyl]hexafluoropropane ("BOAP") and its derivatives are known. Cures using these compounds tend to be slower to completion. Accordingly, these curatives may be used in concert with peroxide cure systems, resulting in a faster overall cure but having the known disadvantages of peroxide-containing system.

While such accelerated cure systems are an improvement, there always remains a need in the art for an improved curing agent capable of more quickly curing fluoroelastomers and perfluoroelastomers, particularly if additional use of a peroxide cure system is not an option. There is further a need in the art for a cure accelerator for perfluoroelastomer curatives that accelerates the cure rate of and maintains the beneficial properties of the elastomer, such as the sealing properties (low sticking) and the chemical and plasma resistant properties.

DETAILED DESCRIPTION OF THE INVENTION

The invention described herein encompasses processable and curable fluoroelastomeric compositions (including perfluoroelastomeric compositions) contains specific cure systems of carefully selected combinations of curatives and cure accelerators that result in reduced cure time, thereby increasing production efficiency. Upon completion of the cure the compositions are characterized by resistance to chemical and thermal degradation, including resistance to degradation when exposed to oxygen plasmas and low sticking properties. Also included in the invention are methods of decreasing the cure times of such fluoroelastomeric compositions and/or perfluoroelastomeric compositions and methods of preparing fluoroelastomeric compositions and/or perfluoroelastomeric compositions that exhibit oxygen plasma resistance.

Fluoroelastomeric compositions and perfluoroelastomeric compositions are included within the scope of the invention. Such terms refer to any polymeric composition that contains a fluoropolymer or perfluoropolymer, respectively. A fluoropolymer may be formed by polymerizing two or more monomers, preferably one of which is fluorinated or perfluorinated, and at least one of which is a cure site monomer to permit curing. Similarly, perfluoropolymers may be formed by polymerizing two or more perfluorinated monomers, including at least one perfluorinated cure site monomer that has at least one functional group to permit curing. Such materials are also commonly referred to as FKMs (fluoroelastomers) and FFKMs (perfluoroelastomers) in accordance with the American Society for Testing and Materials (ASTM) definition (ASTM-D-1418-01a), incorporated herein by reference.

A fluoroelastomer composition as described herein may include any suitable curable fluoroelastomeric fluoropolymer(s) capable of being cured to form a fluoroelastomer, and one or more curatives as described herein. The perfluoroelastomeric composition as described herein may include any suitable curable perfluoroelastomeric perfluoropolymer(s) capable of being cured to form a perfluoroelastomer, and the cure system described herein.

A perfluoroelastomeric composition is a polymeric composition including a curable perfluoropolymer. The perfluoropolymer as noted above is formed by polymerizing two or more perfluorinated monomers, preferably also including at least one perfluorinated monomer that has at least one functional group to permit curing. A perfluoroelastomer is a perfluorinated rubber of the polymethylene type having all fluoro, perfluoroalkyl, or perfluoroalkoxy substitutent groups on the polymer chain; a small fraction of these groups may contain functionality to facilitate vulcanization. A fluoroelastomer is a fluoro rubber of the polymethylene type that utilizes vinylidene fluoride as a comonomer and has substituent fluoro, alkyl, perfluoroalkyl or perfluoroalkoxy groups on the polymer chain, with or without a cure site monomer (having a reactive pendant group).

Perfluoroelastomeric compositions may include two or more of various perfluorinated copolymers of at least one fluorine-containing ethylenically unsaturated monomer, such as tetrafluoroethylene (TFE); a perfluorinated olefin, such as hexafluoropropylene (HFP); and a perfluoroalkylvinyl ether (PAVE) which include alkyl groups that are straight or branched and which include one or more ether linkages, such as perfluoro(methyl vinyl ether), perfluoro (ethyl vinyl ether), perfluoro(propyl vinyl ether) and similar compounds. Examples of such PAVES include those described in U.S. Pat. Nos. 5,001,278; 5,696,189; and 4,983, 697 and in WO 00/08076, the contents of each of which are incorporated herein by reference. In the practices of the invention, it may be desirable to use perfluoropolymers that are terpolymers or tetrapolymers of TFE, PAVE, and have at least one perfluorinated cure site monomer that incorporates a functional group to permit crosslinking of the terpolymer, and which may permit curing using the specified cure system described herein. In some embodiments of the invention, the perfluoropolymer includes at least monomers of each tetrafluoroethylene, perfluoroalkylvinyl ether and at least one cure site monomers (as described below).

Alternatively, it may be desirable to use fluoropolymers that are copolymers incorporating monomers such as TFE, vinylidene fluoride (VF$_2$) and those monomers as noted above with respect to perfluoropolymers. Preferably the fluoropolymers have cure site monomers capable of being cured by standard curatives and/or the preferred curatives described herein, and which are capable of having such curing accelerated by the preferred accelerators according to the invention. In addition, it is preferred that the fluoropolymers used are included within the group of more highly fluorinated fluoropolymers known in the art.

The fluoropolymer and perfluoropolymers used in the practice of the invention should include at least one cure site monomer that comprises at least one cyano group ("cyano cure site monomers"), although other functional groups or cure sites may be present. The selected cyano cure site monomer may include any number of cyano groups, although monomers having 1, 2, 3, 4, 5, 6, 7, or 8, cyano groups may be suitable. Any cyano cure site monomer may be used including relatively simple nitrile monomers, fluorinated olefins, fluorinated vinyl ethers, and monomers as described in, for example, U.S. Pat. No. 4,281,092, the contents of which is incorporated herein by reference. Other examples of cyano cure site monomers include the general examples:

$CF_2$=CF—O—[$CF_2$]$_n$—CN, wherein n is an integer 2 to about 12 or 2 to 6;
$CF_2$=CF—O—[$CF_2$—CF($CF_3$)—O]$_n$—$CF_2$—, wherein n is an integer of 0 to 4 or 0 to 2;
$CF_2$=C—[$OCF_2CF(CF_3)$]$_m$—O—[$CF_2$]$_n$—CN, wherein m is an integer of 1 to 2 and n is an integer of 1 to 4;
$CF_2$=CF—O—[$CF_2$]$_n$—O—CF($CF_3$)—CN, wherein n is an integer of 2 to 4;
$CF_2$=CFOCF$_2$CF(CF((F$_3$)OCF$_2$CF$_2$CN);
$CF_2$=CF—O[$CF_2$]$_3$—O—CF[$CF_3$]—CN; and
CF2-CF(O—($CF_2$)$_3$—O—(CFCF$_3$)—CN)—[$CF_2$—CF (O—$CF_2$—CFCF$_3$—O—$CF_3$—$CF_2$—CN)]

where "p" in the above structure is a secondary cure site monomer present in a fluoropolymer or perfluoropolymers in an amount of about 0.1 to about 12 mol %, or about 1 to about 4 mol %, and "a" represents a primary cure site monomer present in an amount of about 0.1 to about 12 mol % or about 1 to about 7 mol %. Alternatively the molar ratio of the primary cure site monomer to the secondary cure site monomer in the copolymer may be about 1:1 to about 10:1, or 9:1.

Regardless of which cure site monomer or combination of monomers is selected, the cure site monomer may be present in the fluoropolymer or perfluoropolymer in any amount. For example, it may be present in the amount of about 0.1 to about 5 mole percent, about 0.1 to about 2.5 mole percent, or about 0.3 to about 1.5 mole percent.

Within the invention is included a cure system that includes at least a functionalized biphenyl-based curative and a dioxime compound. The dioxime compound may be any known or to be developed in the art. It may be, for example, a dioxime compound represented by the formula (I): HON=$R^1$=NOH. In formula I, $R^1$ may be any hydrocarbon group (including ring structures and ethers), substituted or unsubstituted. $R^1$ may be, for example, a hydrocarbon group having 1 to 50 carbon atoms, 1 to 30 carbon atoms or 1 to 10 carbon atoms. It may be an alkyl group or an aryl group. It some embodiments $R^1$ is p-quinone dioxime.

Aryl dioximes include, but are not limited to, p-benzoquinone dioxime, napthoquinone dioxime, toluiquinone dioxime, diphenoquinone dioxime, diquinoyl dioxime, dibenzoyl dioxime, p, p$^1$-dibenzoylquinonedioxime or combinations of these compounds.

The functionalized biphenyl-based curative may be any known or to be developed in the art; one may choose use of one functionalized biphenyl-based curative or a combination of any number of functionalized biphenyl-based curatives. The functionalized biphenyl-based curative may be, for example, 2,2-bis[3-amino-4-hydroxyphenyl]hexafluoropropane ("BOAP") and related derivative compounds. They include branched or straight chain alkyl, halogenated alkyl, perhalogenated alkyl, and perfluoroalkyl compounds that may contain one or more oxygen atoms, which may be substituted, and which have at least two aminophenyl groups, preferably two aminophenol groups. It may be further desirable that the selected functionalized biphenyl-based curative(s) has melting point of no greater than about 240° C., no greater than about 230° C., and no greater than about 225° C.

It may be an functionalized biphenyl-based curative represented by formula (II):

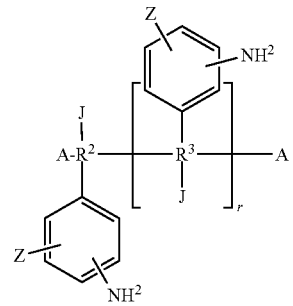

In formula (II), $R^2$ and $R^3$ are each independently chosen from a carbon atom or any hydrocarbon based group, such as, for example, an alkyl, a halogenated alkyl, a perfluorinated alkyl, an alkyl ether, a halogenated alkyl ether, a perfluorinated alkyl ether. Regardless, one or more than one of the carbon atoms that is not fluorine- or halogen-bound may be substituted or remain unsubstituted. The Z group in formula I may represent an amino group, a mercapto group, a sulfhydryl group and a hydroxyl group, each of which may be independently selected for each occurrence of Z. A is independently chosen from a fluorine atom, those groups listed above as suitable for $R^2$, above, and compounds represented by the formula (III):

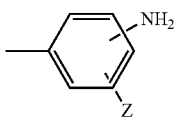

J is independently chosen from those groups listed above as suitable for A and the compounds represented by formula (III). The "r" is chosen from the integers 0 or 1. However, in an embodiment where r is 0 and $R^2$ is a carbon atom at least one of J or A may not be a compound represented by formula (III).

The selected cure system including as least the functionalized biphenyl-based curative and the dioxime compound present in the composition in any amount, since amounts will vary depending on the mixture and number of cure sites and cure site monomers present in the fluoropolymer or perfluoropolymer. However, if a functionalized biphenyl-based curative is present it may be desirable that it is present in an amount of about 0.001 to about 2 parts (phr), alternatively about 0.2 to about 1.7 phr, or about 0.5 to about 1.5 phr by weight and the selected dioxime compound(s) is present in an amount of about 0.001 to about 2 parts, or 0.2 parts to about 1.6 parts or about 0.5 to about 1 parts.

Other curatives and/or cure accelerators may be present in the cure system. The nature and type of such additional components will vary depending on the cure sites present in the polymer. In an embodiment, the cure system includes an monoamidine-based compound represented, for example, by formula (IV):

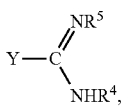

wherein Y may be a substituted or unsubstituted alkyl, aryl, or aralkyl group or an unsubstituted or substituted fully or partially halogenated alkyl, aryl, or aralkyl group having to 22 carbon atoms. Y may also be a perfluoroalkyl, perfluoroaryl, or perfluoroaralkyl group of 1 to 22 carbon atoms or alternatively, of 1 to 12 carbon atoms, or of 1 to 9 carbon atoms. $R^4$ may be a hydrogen atom or a substituted or unsubstituted lower alkyl group of 1 to 6 carbon atoms, or an amino group. $R^5$ may be independently any of the groups listed above for $R^4$ or an hydroxyl.

Substitution groups for Y, $R^4$ or $R^5$ include, without limitation, halogenated alkyl, perhalogenated alkyl, thio, amine, imine, amide, imide, halogen, carboxyl, sulfonyl, hydroxyl, and the like. It may be desirable that $R^5$ is hydroxyl, hydrogen or substituted or unsubstituted alkyl group of 1 to 6 carbon atoms and/or $R^4$ is a hydrogen atom, amino or a substituted or unsubstituted lower alkyl of 1 to 6 carbon atoms.

Exemplary monoamidine-based compounds include perfluoroalkylamidines, arylamidines and perfluoroalkylamidrazones, such as for example, perfluorooctanamidine, heptafluorobutyrylamidine, and benzamidine.

When a monoamidine-based compound such as, for example, heptafluorobutyrylamidine, is present, the cure system may contain the functionalized biphenyl-based curative in the amount of about 0.001 to parts to about 2 parts (phr), alternatively about 0.25 to about 1.7 phr, or about 0.5 to about 1.5 phr by weight and, the dioxime compound in an amount about 0.001 part to about 1 part, or 0.25 to 2.0 parts, or 0.5 parts to about 0.7 parts by weight, and the monoamidine-based compound in an amount about 0.001 parts to about 2 parts, 0.3 parts to about 1.7 parts or 0.7 parts to about 1.5 parts.

The cure system may include other curatives, cure accelerators, and/or other components depending on the presence and kind of non-cyano cure sites that may be present in the selected fluoropolymers or perfluoropolymers. In some instances, however, it may be desired that the curable perfluoroelastomeric and/or fluoroelastomeric compositions do not contain a peroxide curative or other components containing the peroxide (ROOR) functional group.

The compositions and methods described as forming parts of the invention may include other additives such as processing aids, fillers, additional polymers or polymer blends (powders, melt blended, particulates), rheology modifiers, lubricants, plasticizers, and colorants. Such additives may include graphite, carbon black, clay, silcas, glass, Hectorite, silicon dioxide, fluoropolymeric particulate, barium sulfate, colorants, titanium dioxide, glass fibers or other particles, polyarid fibers, filmed silicas, amorphous silica, and oils. In an embodiment where the additive is a silicon dioxide, silicon dioxides having a median particle size of about 2 to about 25 μm may be used. Oils may be synthetic or natural oils, such as, for example, mineral oils, plant-derived oils and perfluoropolyethers.

In an embodiment, compositions contain fumed silicon dioxide, PTFE particulates or powder and/or carbon particles, nanotubes, fibers or filaments. Such embodiments(s) may include a fluoroelastomer or a perfluoroelastomer.

Colorants may be added to the compositions described. Any colorants may be used, including, for example, those of polycyclic aromatic structures containing carbon atoms, hydrogen atoms, nitrogen atoms, and oxygen atoms, but which are substantially free of metals. Such compounds may be substituted with chlorine or bromine for color variations.

Suitable colorants are listed in the W. Herbst et al., Industrial Organic Pigments, VCH\Wiley, $2^{nd}$ ed., 1997. Other suitable colorants include quinacridones, benzimidazalones, indanthrones, perylenes, isoindonlinones, and combinations of these colorants. Other possible compounds include quinacerdione magenta (C.I. pigment red 122, 192, 202 and 206), Monastral red B, violet dyes such as C.I. violet 19, hue 9-dimethyl-substituted quinacridione and anthraquinone dyes (C.I. 60710, C.I. dispersed red 15, C.I. 26050, C.I. solvent red 19), Rodamine RS (C.I. pigment red 81), orange dyes such as C.I. orange 48 and C.I. orange 49, diarylide yellows, C.I. pigment yellow 12, 13, 14, 16, 17, 55, 83 and 155), Indanthrene golden yellow G.K, arylamide yellow (C.I. pigment yellow 1, 3, 10, 73, 74, 97, 105, 111) and combinations of these colorants, which can be used for varying effects and different compositions. In some embodiments, it is preferred that the colorant used is quinacridione having the structure (V) and the related structure represented by formula (VI), below:

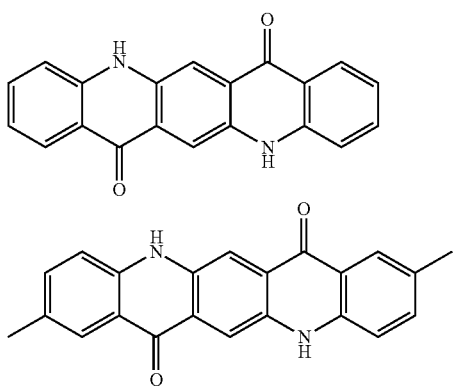

Also contemplated within the scope of the invention, methods of the decreasing the cure time of a fluoroelastomeric composition. Such methods include combining a fluoropolymer including at least one cure site monomer that contains at least one cyano group, as described above and a cure system. The cure system may contain at least a functionalized biphenyl-based compound and a dioxime compound as detailed above. The cure systems of the method may also comprise at least one of a monoamidine-based cure system (e.g., represented by Formula IV, above), a dioxime compound, and/or a perfluoropolyether and/or a combination of any of these, as detailed above.

Alternatively, the invention includes a method of decreasing the cure time of a perfluoroelastomeric composition that includes combining a perfluoropolymer as described above with the cure systems described above. In each case, the combined polymer and cure system is subsequently cured. Curing may be accomplished by any means known or to be developed in the art, including, i.e., heat cure, ambient temperature cure, radiation curing. An exemplary process for press curing is to placed the material in a press, heat the material and the press to a temperature of 350° F. to 360° F. for a period of time, such as 15 minutes to 230 minutes. In any method or composition embodiment of the invention, any additives and/or additional cure system components may be included.

If desired, articles/compositions prepared by the methods described herein may be subjected tot a post cure or finishing process, such as, for example, placing the articles in an 550° F. oven for a period of time, e.g., twenty four hours, in air on in nitrogen.

With the practice of these methods the cure time is decreased by about 30% to about 60%, by about 40% to about 50%, relative to a curable composition that does not contain a cure system as described herein.

Also included within the invention are methods of preparing a perfluoroelastomer or fluoroelastomer composition that exhibits resistance to oxygen plasma. The method includes combining the perfluoroelastomer or fluoroelastomer and the cure system as described above by curing the composition, such that the resultant perfluoroelastomer composition exhibits resistance to oxygen plasma.

The invention is below further described in accordance with the following non-limiting examples. Oxygen plasma resistance data in the Examples was obtained by placing the samples in a plasma chamber having chamber walls and chuck maintained at a defined temperature value between 25° C. to 150° C. and containing a mixture of oxygen and $CF_4$ gases. The samples are placed in the chamber at a consistent stretch, defined between 5-50%. The samples are periodically visually inspected under magnification. Oxygen plasma resistance is measured in minutes before appearance of cracks.

Testing to determine sticking force in the Examples was carried out using O-ring samples having dimensions as follows: internal diameter of 0.984±0.010 inches and cross-section of 0.0139±0.004 inches. The o-ring sample is compressed 25% in a fixture between plates. Fixture and sample are placed in a forced air oven for twenty four hours at 392° F. The fixture is allowed to cool. The force to pull the plates apart is measured. This force is the sticking force. Three data points were taken for each sample and averaged to obtain the average sticking force value.

Example 1: Preparation of a Perfluoroelastomeric Compositions and Evaluation of $O_2$ Plasma Resistance and Sticky Force of Each The perfluoroelastomeric compositions A-R shown below were prepared by compounding the components as shown in the Table 1. Oxygen plasma resistance and sticking force data are shown for each. C1, as shown in the Table, is a comparative composition.

TABLE 1

| | A | B | C | D | E | F | G | H | I | J |
|---|---|---|---|---|---|---|---|---|---|---|
| Perfluoroelastomer | 100 | 100 | 100 | 100 | 100 | 100 | 100 | 100 | 100 | 100 |
| BOAP | .75 | .75 | .75 | 1 | 1 | 1 | 1 | 1 | .5 | .5 |
| peroxide crosslinking agent | — | — | — | — | — | — | — | — | — | — |
| p-benzoquinone dioxime | .5 | .75 | .5 | .67 | .67 | — | — | — | .33 | .33 |
| Heptafluorobutyrylamidine | — | — | — | — | — | .67 | .34 | .67 | — | — |
| silicon dioxide | 15 | 15 | 3 | 3 | 3 | 15 | 15 | 15 | 10 | 20 |
| perfluoropolyether | 5 | 5 | 3 | 3 | 3 | 5 | 5 | — | 5 | 5 |
| PTFE particles | — | — | 2 | 5 | 2 | — | — | — | — | — |
| Colorant | .5 | .5 | 1 | — | — | .5 | .5 | .5 | .5 | .5 |
| Zirconate | — | — | — | — | — | — | — | — | — | — |
| Rheological properties | R1 | R1 | R1 | R1 | R1 | R3 | R4 | R3 | R1 | R1 |
| T90 time (min) | 10.30 | 8.96 | 12.68 | 11.18 | 11.99 | 7.05 | 8.10 | 7.77 | 10.59 | 15.05 |
| Plasma resistance, minutes | 60 | 30 | 120 | 150 | 150 | 30 | 30 | 30 | 60 | 30 |
| Sticking force, lbsf | 50.4 | 47 | 40.9 | 42.9 | 38 | n/t | 48.7 | 30.5 | 47.6 | 41 |
| | K | L | M | N | O | P | Q | R | C1 |
| Perfluoroelastomer | 100 | 100 | 100 | 100 | 100 | 100 | 100 | 100 | 100 |
| BOAP | 1.5 | 1 | 1 | — | — | .75 | 1 | .5 | 1.5 |

TABLE 1-continued

| | | | | | | | | | |
|---|---|---|---|---|---|---|---|---|---|
| peroxide crosslinking agent | 1 | — | — | 1.5 | 1.5 | — | — | — | 1 |
| p-benzoquinone dioxime | — | .67 | .67 | — | — | .5 | .5 | .5 | — |
| Heptafluorobutyrylamidine | — | — | — | — | — | — | — | — | — |
| silicon dioxide | 15 | 10 | 10 | 18 | 18 | — | — | — | 18 |
| perfluoropolyether | 5 | 1.5 | 3 | 3 | 3 | 3 | 3 | 3 | — |
| PTFE particles | — | 2 | 2 | — | — | — | — | — | — |
| Colorant | 5 | .5 | .5 | — | — | 1 | 1 | 1 | 1 |
| Zirconate | — | — | .2 | 3 | 3 | — | — | — | 1 |
| Rheological properties | R5 | R1 | R1 | R6 | R6 | R1 | R1 | R1 | R2 |
| T90 time (min) | 12.11 | 13.75 | 12.36 | 0.63 | 1.00 | 14.26 | 14.55 | 14.68 | 23.26 |
| Plasma resistance, minutes | 30 | 150 | 90 | n/t | n/t | 180 | 120 | 240 | 30 |
| Sticking force, lbsf | 33 | 49.7 | 42.5 | 4.8 | 22.5 | 22.5 | 30.5 | 41.1 | 85.5 |

Cure parameters A through O and C1: mold 350° F.-360° F. for 15-30 minutes, post cure 24 hours at 550° F. in air: Cure parameters P through R—Mold 20 min at 350° F. Post cure is 2(ramp up)/20(hold)/2(ramp down) hrs at 550° F. in air. "N/t" indicates not tested.

R1—30 min @ 360° F.
R2—30 min @ 350° F.
R3—10 min @ 350° F.
R4—10 min @ 360° F.
R5—15 min @ 360° F.
R6—8 min @ 300° F.

As can be seen in Table 1, all compositions A-R exhibit greater resistance to oxygen plasma relative to C1 as well as low sticking properties.

We claim:

1. A method of decreasing the cure time of a fluoroelastomeric composition comprising combining:
   (i) a fluoropolymer that comprises at least one cure site monomer comprises 2 to 5 cyano groups and
   (ii) a cure system comprising a compound represented by the formula (II):

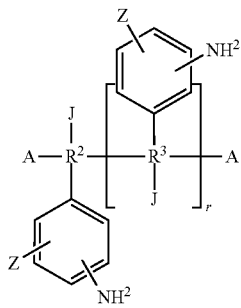

wherein $R^2$ and $R^3$ are each independently chosen from a carbon atom, an alkyl, a halogenated alkyl, a perfluorinated alkyl, an alkyl ether, a halogenated alkyl ether, a perfluorinated alkyl ether; Z is independently chosen from an amino group, a mercapto group, a sulfhydryl group and a hydroxyl group; A is independently chosen from a fluorine atom, $R^2$, and compounds represented by the formula (III):

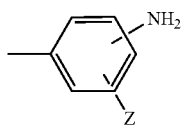

J is independently chosen from A and the compounds represented by formula (III);

provided that when r is 0 and $R^2$ is a carbon atom at least one of J or A is not a compound represented by formula (III), and at least one of:
a dioxime compound represented by the formula (I):

$$HON=R^1=NOH$$

wherein $R^1$ is chosen from an alkyl group having 1 to 10 carbon atoms and an aryl group having 1 to 10 carbon atoms; a monoamidine-based compound represented by formula (IV):

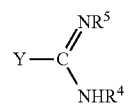

wherein Y is chosen from a substituted or unsubstituted alkyl, aryl, or aralkyl group or an unsubstituted or substituted fully or partially halogenated alkyl, aryl, or aralkyl group having 1 to 22 carbon atoms; $R^4$ is chosen from a hydrogen atom or a substituted or unsubstituted lower alkyl group of 1 to 6 carbon atoms, or an amino group; $R^5$ is independently chosen from hydrogen atom, a substituted or unsubstituted lower alkyl group of 1 to 6 carbon atoms, an amino group or an hydroxyl group;
and
a perfluoropolyether;
and curing the composition for cure time.

2. The method of claim 1, wherein the cure system comprises a monoamidine-based compound that is heptatfluorobutyrlamidine.

3. The method of claim 1, wherein the cure system comprises a dioxime compound that is an aryl dioxime.

4. The method of claim 1, wherein the fluoropolymer comprises tetrafluoroethylene, a perfluoroalkylvinyl ether, and at least one cure site monomer.

5. The method of claim 1, wherein the cure time is decreased by about 30% to about 60% relative to a curable composition that does not contain the cure system of (ii).

6. The method of claim 1, further comprising combining a colorant selected from the group consisting of a quinacridone, a benzimidazalone, an indanthrone, a perylene, an isoindolinone, and an isoindoline into the fluoropolymer.

7. The method of claim 6, wherein the colorant is a quinacridone.

8. A method of preparing a perfluoroelastomer composition that exhibits resistance to oxygen plasma comprising:

(i) combining a perfluoroelastomer comprises at least one cure site monomer that comprises two to five cyano groups; a cure system comprising a functionalized biphenyl-based compound represented by the formula (II):

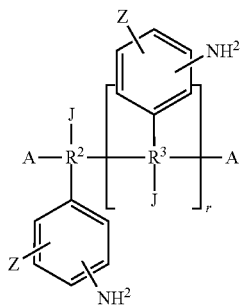

wherein $R^2$ and $R^3$ are each independently chosen from a carbon atom, an alkyl, a halogenated alkyl, a perfluorinated alkyl, an alkyl ether, a halogenated alkyl ether, a perfluorinated alkyl ether; Z is independently chosen from an amino group, a mercapto group, a sulfhydryl group and a hydroxyl group; A is independently chosen from a fluorine atom, $R^2$, and compounds represented by the formula (III):

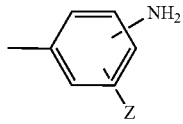

J is independently chosen from A and the compounds represented by formula (III);
provided that when r is 0 and $R^2$ is a carbon atom at least one of J or A is not a compound represented by formula (III), and at least one of:
a dioxime compound represented by the formula (I):

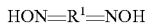

HON=$R^1$=NOH wherein $R^1$ is chosen from an alkyl group having 1 to 10 carbon atoms and an aryl group having 1 to 10 carbon atoms and heptafluorobutyrylamidine; a silicon dioxide having a median particle size of about 2 to about 25 um; and a polytetrafluoroethylene particle; and
a monoamidine-based compound represented by formula (IV):

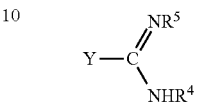

wherein Y is chosen from a substituted or unsubstituted alkyl, aryl, or aralkyl group or an unsubstituted or substituted fully or partially halogenated alkyl, aryl, or aralkyl group having 1 to 22 carbon atoms; $R^4$ is chosen from a hydrogen atom or a substituted or unsubstituted lower alkyl group of 1 to 6 carbon atoms, or an amino group; $R^5$ is independently chosen from hydrogen atom, a substituted or unsubstituted lower alkyl group of 1 to 6 carbon atoms, an amino group or an hydroxyl group;
and
a perfluoropolyether,
(ii) curing the composition for a cure time to obtain a perfluoroelastomer composition that exhibits resistance to oxygen plasma.

9. The method of claim 8, wherein the cure system comprises a monoamidine-based compound that is heptfluorobutyrlamidine.

10. The method of claim 8, wherein the cure system comprises a dioxime compound that is an aryl dioxime.

11. The method of claim 8, wherein the fluoropolymer comprises tetrafluoroethylene, a perfluoroalkylvinyl ether, and at least one cure site monomer.

12. The method of claim 8, further comprising combining a colorant chosen from a quinacridone, a benzimidazalone, an indanthrone, a perylene, an isoindolinone, and an isoindoline the perfluoropolymer.

* * * * *